Jan. 15, 1957  A. SCHLESSER  2,777,571

PILL AND CAPSULE DISPENSER

Filed March 21, 1955

Adolph Schlesser
INVENTOR.

BY

United States Patent Office 2,777,571
Patented Jan. 15, 1957

2,777,571

PILL AND CAPSULE DISPENSER

Adolph Schlesser, Glendale, Calif.

Application March 21, 1955, Serial No. 495,635

1 Claim. (Cl. 206—42)

My invention relates to a container and dispensing unit for pills, tablets, capsules and the like.

An object of the invention is to provide a simple, light and practical package for containing cylindrical or spherical envelopes of medicine, tablets, pellets and the like that are to be taken periodically as required, and from which the contents may be emptied in whole or in part.

Another object of the invention is to provide an inexpensive, portable dispenser of translucent or transparent material and few parts so arranged that they may be readily assembled and disassembled and which may be quickly loaded or replenished without disturbing the interrelated parts.

Other objects will appear from the following specification in connection with the accompanying drawing.

In the drawing,

Fig. is a plan view of the underside of the cover used in my invention.

Figure 1:
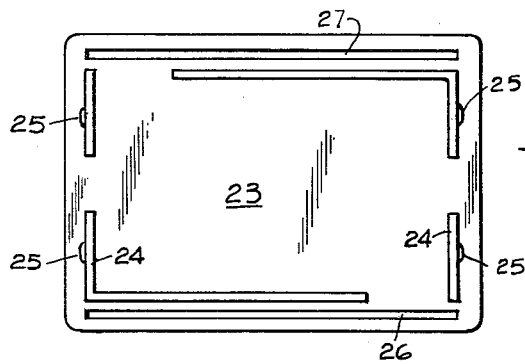
Figures 2, 3:
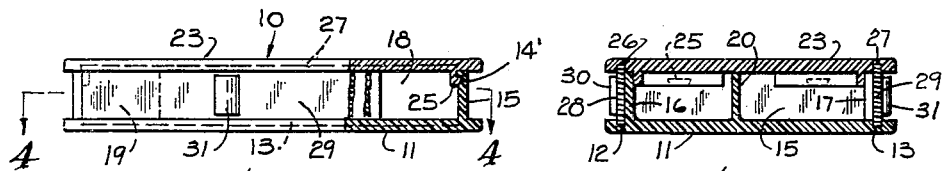
Fig. 2 is a side elevation of the container, a part thereof being on a section taken on line 2—2 of Fig. 4.
Fig. 3 is a cross-section on line 3—3 of Fig. 4, looking in the direction of the arrow.
Figure 4:
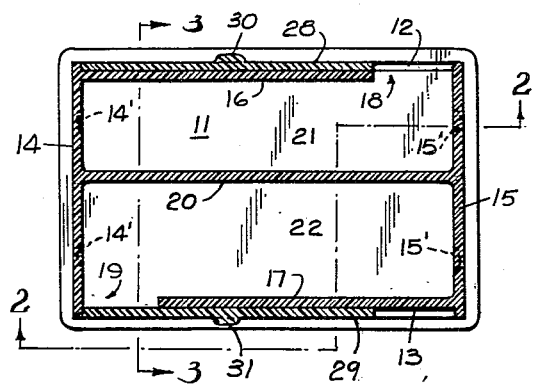
Fig. 4 is a horizontal section on line 4—4 of Fig. 2.

Referring to the drawing, 10 designates a receptacle, which comprises a rectangular base plate 11, having longitudinal grooves 12 and 13 near the lateral edges thereof. At right angles to said base plate 11 are end walls 14 and 15, and side walls 16 and 17, which are disposed within the area defined by said grooves 12 and 13. The side wall 16 extends from the end wall 14 to near the end wall 15, defining thereby an opening 18. The side wall 17 extends from the end wall 15 to near the end wall 14 and defines thereby an opening 19. The end wall 14 extends slightly beyond the side wall 16 and the end wall 15 extends slightly beyond the side wall 17, such extended portions forming stops, as presently appearing.

A longitudinal, central, partition equal in height to the side and end walls 20 divides the base plate 11 into two compartments 21 and 22 and the openings 18 and 19 respectively are provided for each compartment and at opposite ends thereof for ejecting or removing the contents or part thereof therefrom or for loading them.

Each end wall 14 and 15 is provided on the inside and near the top thereof with depressions 14' and 15' for purposes presently appearing.

Associated with said rectangular receptacle 10 and readily removable therefrom, is a cover plate 23 having at each end depending lips 24, each provided with detents 25 for snap engagement with said depressions 14' and 15' and locking together the receptacle and said cover plate 23.

The cover plate 23 extends over and beyond the side walls 16 and 17 to provide purchase for the thumb and fingers when removing the cover plate from the compartmented base and in the face thereof is provided with longitudinal grooves 26 and 27 in line with the grooves 12 and 13 in said rectangular base plate 11.

Valves or gates 28 and 29 are mounted to slide in said grooves to open or close the openings 18 and 19 to make available the ejection of a pill or capsule or both or to refill the compartments or prevent the escape or accidental removal of the contents from either of the compartments. These gates 28 and 29 engage the extended portions of the end wall 14 and 15 when moved to uncover the openings 18 and 19, respectively, and thereby prevent the dissociation thereof from the assembled unit.

In assembling the parts of the container, the valves or gates 28 and 29 are first placed in the grooves 12 and 13 of the base plate 11. The cover plate 23 is thereupon mounted upon the tops of the side walls 16 and 17 and the grooves 26 and 27 thereof are made to receive the valves or gates 28 and 29, for sliding movement therein, knobs 30 and 31 on said gates providing purchases for the thumb or other member to operate same and the end walls providing stops for limiting the extent of movement of said gates or valves. Pressure applied to the cover plate forces the detents 25 on the lips 24 into snap engagement with the depressions 14' and 15' and thus the cover plate 23 is firmly secured in position, as are also the valves or gates. The cover plate 23 is readily removable, to enable the compartments to be cleaned, by an upward pressure against the underside thereof.

What I claim is:

A non-metallic, transparent dispensing container of the character referred to comprising a rectangular base plate having side walls and end walls inwardly from the outer edge of said plate, said base plate having a central longitudinal partition dividing the plane thereof into two compartments and connecting said end walls, one end of each of said end walls extending slightly beyond the respective ends of said side walls and at opposite sides thereof to form stops, one of said side walls extending from one of said end walls to near one end of the opposite end wall to define an opening for one of said compartments, and the other of said side walls extending from said opposite end wall to near one end of the other of said end walls to define an opening in the other of said compartments; said plate having a longitudinal groove paralleling each side of said side walls, said end walls having near the top thereof a plurality of depressions; a rectangular cover cooperating with said side walls and end walls of said base plate to form therewith an enclosure for said compartments, said cover having depending lips inwardly from the edges thereof provided with detents for engagement with the depressions in said end walls to lock said cover in removable engagement with said end walls, said cover plate having grooves at each side inwardly from the edges thereof and paralleling the outside of said side walls, said grooves in said cover plate being in line with the grooves in said base plate and rigid gates mounted to slide in the grooves of said base plate and cover plate to cover or uncover the openings in said compartments, the longitudinal movement of said gates being limited by the extended ends of said end walls.

References Cited in the file of this patent

UNITED STATES PATENTS

| | | |
|---|---|---|
| 2,475,896 | Husted | July 12, 1949 |
| 2,504,850 | Lermer | Apr. 18, 1950 |
| 2,589,936 | Habicht | Mar. 18, 1952 |
| 2,636,469 | McKay | Apr. 28, 1953 |
| 2,722,309 | Waterman | Nov. 1, 1955 |